(12) United States Patent
Maxwell

(10) Patent No.: US 12,230,269 B2
(45) Date of Patent: *Feb. 18, 2025

(54) SYSTEMS AND METHODS TO VERIFY TRIGGER KEYWORDS IN ACOUSTIC-BASED DIGITAL ASSISTANT APPLICATIONS

(71) Applicant: GOOGLE LLC, Mountain View, CA (US)

(72) Inventor: Alex Maxwell, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,058

(22) Filed: Jan. 8, 2024

(65) Prior Publication Data

US 2024/0144928 A1    May 2, 2024

Related U.S. Application Data

(63) Continuation of application No. 17/567,668, filed on Jan. 3, 2022, now Pat. No. 11,869,504, which is a
(Continued)

(51) Int. Cl.
*G10L 15/22*     (2006.01)
*G06F 16/955*    (2019.01)
(Continued)

(52) U.S. Cl.
CPC .......... *G10L 15/22* (2013.01); *G06F 16/9558* (2019.01); *G06F 21/552* (2013.01);
(Continued)

(58) Field of Classification Search
CPC .......... G06F 16/24522; G06F 16/3329; G06F 16/3334; G06F 16/951; G06F 16/9558;
(Continued)

(56) References Cited

U.S. PATENT DOCUMENTS 6,526,126 B1    2/2003  Morganstein
7,006,605 B1    2/2006  Morganstein
(Continued)

FOREIGN PATENT DOCUMENTS

CN    108551766    9/2018
CN    108738362    11/2018

OTHER PUBLICATIONS

China National Intellectual Property Administration; Notice of Grant issued in Application No. 201980002173.8; 7 pages; dated Jan. 29, 2024.
(Continued)

*Primary Examiner* — Gerald Gauthier
(74) *Attorney, Agent, or Firm* — Gray Ice Higdon

(57)    ABSTRACT

Systems and methods of verifying trigger keywords in acoustic-based digital assistant applications are provided. A system can receive, from an application developer computing device, a request to generate a voice-based software application. The request can include a uniform resource locator (URL) associated with a service provided by the voice-based software application and an identifier corresponding to the URL. The system can identify a plurality of links that include the URL as a target. The system can determine a subset of the plurality of links having a respective character string that includes a reference to the identifier for the URL. The data processing system can compare the subset of the plurality of links to a threshold to determine a match level, and can determine a verification status of the request based on the match level.

18 Claims, 4 Drawing Sheets

Related U.S. Application Data continuation of application No. 16/485,069, filed as application No. PCT/US2019/042263 on Jul. 17, 2019, now Pat. No. 11,217,243.

(51) Int. Cl.

| | |
|---|---|
| *G06F 21/55* | (2013.01) |
| *G06F 40/205* | (2020.01) |
| *G10L 15/18* | (2013.01) |
| *G10L 15/30* | (2013.01) |
| *H04L 9/40* | (2022.01) |
| *H04L 67/02* | (2022.01) |
| *H04L 67/146* | (2022.01) |
| *G10L 15/08* | (2006.01) |
| *H04W 88/02* | (2009.01) |

(52) U.S. Cl.
CPC ........ *G06F 40/205* (2020.01); *G10L 15/1822* (2013.01); *G10L 15/30* (2013.01); *H04L 63/1483* (2013.01); *H04L 67/02* (2013.01); *H04L 67/146* (2013.01); *G06F 2221/033* (2013.01); *G06F 2221/2119* (2013.01); *G10L 2015/088* (2013.01); *G10L 2015/223* (2013.01); *H04W 88/02* (2013.01)

(58) Field of Classification Search
CPC .... G06F 21/552; G06F 21/554; G06F 40/205; G06F 40/232; G06F 2221/033; G06F 2221/2119; G06N 5/04; G06Q 20/16; G06Q 30/02; G06Q 40/08; G10L 15/14; G10L 15/1822; G10L 15/22; G10L 15/26; G10L 15/30; G10L 2015/088; G10L 2015/223; G10L 15/1815; G10L 17/04; G10L 17/24; H04L 9/3226; H04L 47/10; H04L 63/1483; H04L 67/02; H04L 67/10; H04L 67/146; H04M 3/4936; H04M 3/4938; H04W 88/02

See application file for complete search history.

(56) References Cited

U.S. PATENT DOCUMENTS

| | | | |
|---|---|---|---|
| 7,089,310 B1 | 8/2006 | Ellerman | |
| 7,219,136 B1* | 5/2007 | Danner | G06Q 20/16 709/224 |
| 7,620,549 B2* | 11/2009 | Di Cristo | G06F 40/232 704/251 |
| 7,769,820 B1 | 8/2010 | Spies et al. | |
| 8,195,468 B2* | 6/2012 | Weider | G10L 15/1815 704/250 |
| 8,605,620 B2* | 12/2013 | Beightol | H04L 47/10 370/252 |
| 9,823,922 B1 | 11/2017 | Carmack | |
| 10,210,868 B2 | 2/2019 | Faaborg | |
| 10,313,348 B2 | 6/2019 | Ma et al. | |
| 10,453,443 B2 | 10/2019 | Kim | |
| 10,714,117 B2 | 7/2020 | Binder et al. | |
| 10,748,529 B1 | 8/2020 | Milden | |
| 10,909,582 B1 | 2/2021 | Brandt et al. | |
| 10,928,918 B2 | 2/2021 | Lemay et al. | |
| 11,217,243 B2* | 1/2022 | Maxwell | G10L 15/1822 |
| 11,488,589 B1* | 11/2022 | Fregly | G10L 15/22 |
| 11,869,504 B2* | 1/2024 | Maxwell | G06F 40/205 |
| 2002/0152093 A1 | 10/2002 | Chalmers et al. | |
| 2003/0064716 A1 | 4/2003 | Gailey | |
| 2004/0064442 A1 | 4/2004 | Popovitch | |
| 2004/0166832 A1* | 8/2004 | Portman | G06Q 30/02 704/E15.047 |
| 2007/0050191 A1* | 3/2007 | Weider | G06F 16/951 704/E15.04 |
| 2008/0255835 A1 | 10/2008 | Ollason et al. | |
| 2010/0145700 A1* | 6/2010 | Kennewick | G06F 16/3329 704/E15.001 |
| 2010/0232580 A1* | 9/2010 | Kurganov | G10L 15/26 379/88.01 |
| 2012/0198418 A1* | 8/2012 | Agarwal | H04M 3/4938 717/106 |
| 2012/0219135 A1* | 8/2012 | Kumar | H04M 3/4936 379/201.01 |
| 2013/0323694 A1 | 12/2013 | Baldwin | |
| 2014/0334645 A1 | 11/2014 | Yun et al. | |
| 2014/0337030 A1 | 11/2014 | Lee et al. | |
| 2015/0011195 A1 | 1/2015 | Li | |
| 2015/0012279 A1 | 1/2015 | Kim | |
| 2016/0071516 A1 | 3/2016 | Lee | |
| 2016/0179752 A1* | 6/2016 | Clark | H04L 67/02 704/270.1 |
| 2016/0218942 A1 | 7/2016 | Choquette et al. | |
| 2016/0277439 A1 | 9/2016 | Rotter | |
| 2016/0294867 A1 | 10/2016 | Tao et al. | |
| 2016/0350070 A1* | 12/2016 | Sung | G06F 16/3334 |
| 2017/0017648 A1 | 1/2017 | Pearlman et al. | |
| 2017/0187866 A1 | 6/2017 | Li | |
| 2017/0221149 A1* | 8/2017 | Hsu-Hoffman | G06Q 40/08 |
| 2017/0263269 A1 | 9/2017 | Kuo | |
| 2017/0289338 A1 | 10/2017 | Riva et al. | |
| 2017/0318072 A1 | 11/2017 | Borrowman et al. | |
| 2018/0191808 A1* | 7/2018 | Bhaya | H04L 67/10 |
| 2018/0210701 A1 | 7/2018 | Segal | |
| 2018/0240463 A1 | 8/2018 | Perotti | |
| 2018/0322103 A1 | 11/2018 | Yeo | |
| 2018/0322536 A1 | 11/2018 | Zhang | |
| 2018/0324201 A1 | 11/2018 | Lowry | |
| 2018/0350379 A1 | 12/2018 | Wung et al. | |
| 2018/0357998 A1* | 12/2018 | Georges | G10L 15/14 |
| 2018/0366124 A1* | 12/2018 | Cilingir | G10L 17/04 |
| 2019/0221228 A1 | 7/2019 | Meshram | |
| 2019/0235882 A1 | 8/2019 | Mishra | |
| 2020/0043576 A1 | 2/2020 | Lehtomäki | |
| 2020/0082279 A1* | 3/2020 | Arora | G06N 5/04 |
| 2020/0098354 A1 | 3/2020 | Lin | |
| 2020/0105256 A1 | 4/2020 | Fainberg et al. | |
| 2020/0175966 A1 | 6/2020 | Velayutham | |
| 2020/0202066 A1 | 6/2020 | Bodera et al. | |
| 2020/0265048 A1* | 8/2020 | Dotan-Cohen | G06F 16/24522 |
| 2020/0395010 A1 | 12/2020 | Smith | |
| 2021/0006544 A1 | 1/2021 | Lewin | |
| 2021/0168535 A1 | 6/2021 | Schoen et al. | |
| 2021/0234832 A1 | 7/2021 | Wood | |
| 2021/0335353 A1* | 10/2021 | Maxwell | H04L 63/1483 |
| 2022/0122608 A1* | 4/2022 | Maxwell | H04L 67/146 |
| 2023/0004567 A1 | 1/2023 | Pichaimurthy | |
| 2024/0144928 A1* | 5/2024 | Maxwell | G10L 15/22 |

OTHER PUBLICATIONS

Medennikov, I. et al.; Acoustic Modeling in the STC Keyword Search System for OpenKWS 2016 Evaluation; 11 pages; dated 2017.

The Korean Intellectual Property Office; Notice of Office Action issued in Application No. 10-2022-7000057; 8 pages: dated Sep. 14, 2023.

European Patent Office; Extended Search Report issued in Application No. 22190544.1, 7 pages, dated Dec. 14, 2022.

European Patent Office; Intention to Grant issued in Application No. 19749071.7, 63 pages, dated Apr. 6, 2022.

European Patent Office; Communication pursuant to Article 94(3) EPC issued in Application No. 22190544.1, 6 pages, dated Jun. 26, 2024.

\* cited by examiner

SYSTEMS AND METHODS TO VERIFY TRIGGER KEYWORDS IN ACOUSTIC-BASED DIGITAL ASSISTANT APPLICATIONS

TECHNICAL FIELD

This specification relates to a system and method to verify trigger keywords in acoustic-based digital assistant applications.

BACKGROUND

Applications can be installed on a computing device. The computing device can execute the applications.

SUMMARY

At least one aspect of this disclosure is directed to a system to verify trigger keywords in acoustic-based digital assistant applications. The system can include a data processing system including at least one request management component, at least one link management component, at least one request verification component, at least one processor and memory. The at least one request management component of the data processing system can receive, from an application developer computing device, a request to generate a voice-based software application. The request can include a URL associated with a service provided by the voice-based software application and an identifier corresponding to the URL. The at least one link management component of the data processing system can identify, from an index of a plurality of web pages, a plurality of HTTP (or other protocol) links that include the URL as a target. Each link can include a respective character string. The data processing system can parse the respective character string of each link of the plurality of links to determine a subset of the plurality of links having a respective character string that includes a reference to the identifier corresponding to the URL. The data processing system can compare the subset of the plurality of links to a threshold to determine a match level. The at least one request verification component of the data processing system can determine a verification status of the request based on the match level. The data processing system can assign a trigger keyword to the voice-based software application, responsive to determining that the verification status of the request indicates that the request is verified. The data processing system can receive, from a mobile computing device, an audio input corresponding to the trigger keyword. The data processing system can cause the voice-based software application to execute on the mobile computing device, responsive to receiving the audio input corresponding to the trigger keyword.

The data processing system may: determine at least one alternate identifier based on the identifier included in the request; and determine the subset of the plurality of links to include at least one link whose respective character string includes a reference to the alternate identifier and does not include a reference to the identifier.

The data processing system may: determine the threshold to correspond to a first percentage; determine a second percentage comprising a fraction of the plurality of links included in the subset; and compare the second percentage to the first percentage to determine the match level.

The data processing system may determine a value for the threshold based on a number of links included in the plurality of links.

The data processing system may parse the respective character string of each link of the plurality of links using natural language processing.

The data processing system may: determine a risk level associated with the request received from the application developer computing device; and determine a value for the threshold based on the risk level.

The data processing system may: determine a type of the voice-based software application; determine a risk level associated with the type of the voice-based software application; and determine a value for the threshold based on the risk level.

The data processing system may: transmit, to a proxy computing device, a request for the plurality of links that include the URL as the target; and receive the plurality of links from the proxy computing device responsive to the request.

The data processing system may: transmit, to a server, a remote procedure call (RPC) including a request for the plurality of links that include the URL as the target; and receive the plurality of links from the server responsive to the RPC.

The data processing system may: determine a top level domain corresponding to the URL included in the request received from the application developer computing device: identify at least one subdomain associated with the top level domain; and identify the plurality of links to include at least one link including a URL corresponding to the subdomain as a target.

The data processing system may: generate at least a portion of the voice-based software application, responsive to determining that the verification status indicates that the request is verified.

The data processing system may: transmit, to the application developer computing device, a notification of the verification status of the request to cause the notification to be displayed on the application developer computing device.

The data processing system may: receive, from a second application developer computing device, a second request to generate a second voice-based software application, the second request including a second URL associated with a second service provided by the second voice-based software application and a second identifier corresponding to the second URL; identify, from the index of the plurality of web pages, a second plurality of HTTP links that include the second URL as a target, each link of the plurality of second links including a respective character string: parse the respective character string of each link of the plurality of second links to determine a subset of the plurality of second links having a respective character string that includes a reference to the second identifier corresponding to the second URL: compare the subset of the plurality of second links to a second threshold to determine a second match level; determine a verification status of the second request based on the second match level; and prevent a second trigger keyword from being assigned to the second voice-based software application, responsive to determining that the verification status of the second request indicates that the second request is not verified.

At least one aspect of this disclosure is directed to a method of verifying trigger keywords in acoustic-based digital assistant applications. The method can include receiving, by a data processing system including at least one request management component, at least one link management component, at least one request verification component, at least one processor, and memory, from an application developer computing device, a request to generate a voice-based software application. The request can include a URL associated with a service provided by the voice-based software application and an identifier corresponding to the URL. The method can include identifying, by the at least one link management component of the data processing system, from an index of a plurality of web pages, a plurality of HTTP links that include the URL as a target. Each link can include a respective character string. The method can include parsing, by the data processing system, the respective character string of each link of the plurality of links to determine a subset of the plurality of links having a respective character string that includes a reference to the identifier corresponding to the URL. The method can include comparing, by the data processing system, the subset of the plurality of links to a threshold to determine a match level. The method can include determining, by the at least one request verification component of the data processing system, a verification status of the request based on the match level. The method can include assigning, by the data processing system, a trigger keyword to the voice-based software application, responsive to determining that the verification status of the request indicates that the request is verified. The method can include receiving, by the data processing system, from a mobile computing device, an audio input corresponding to the trigger keyword. The method can include causing, by the data processing system, the voice-based software application to execute on the mobile computing device, responsive to receiving the audio input corresponding to the trigger keyword.

The method may further comprise determining, by the data processing system, at least one alternate identifier based on the identifier included in the request; and determining, by the data processing system, the subset of the plurality of links to include at least one link whose respective character string includes a reference to the alternate identifier and does not include a reference to the identifier.

The method may further comprise: determining, by the data processing system, the threshold to correspond to a first percentage; determining, by the data processing system, a second percentage comprising a fraction of the plurality of links included in the subset: and comparing, by the data processing system, the second percentage to the first percentage to determine the match level.

The method may further comprise: determining, by the data processing system, a value for the threshold based on a number of links included in the plurality of links.

The method may further comprise: parsing, by the data processing system, the respective character string of each link of the plurality of links using natural language processing.

The method may further comprise: determining, by the data processing system, a risk level associated with the request received from the application developer computing device; and determining, by the data processing system, a value for the threshold based on the risk level.

The method may further comprise: determining, by the data processing system, a type of the voice-based software application; determining, by the data processing system, a risk level associated with the type of the voice-based software application; and determining, by the data processing system, a value for the threshold based on the risk level.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
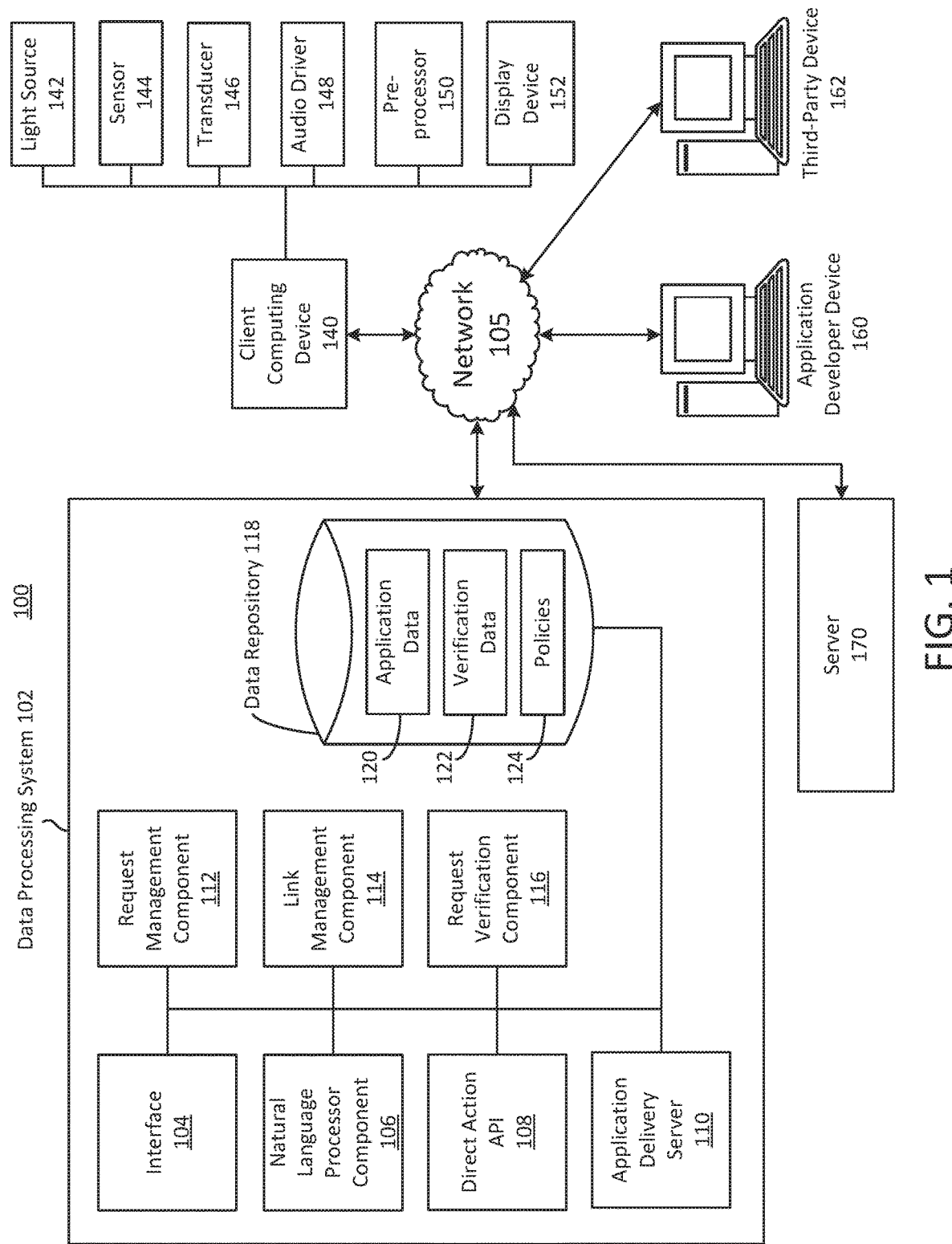
FIG. 1 is an illustration of an example system to verify trigger keywords in acoustic-based digital assistant applications.

Following below are more detailed descriptions of various concepts related to, and implementations of, methods, apparatuses, and systems of verifying trigger keywords in acoustic-based digital assistant applications. The various concepts introduced above and discussed in greater detail below may be implemented in any of numerous ways.

This disclosure is generally directed to verifying trigger keywords in acoustic-based digital assistant applications. An application developer may want to develop a software application having an acoustic-based component. Such an application may be used by an end user to perform a wide range of functions, which may correspond to one or more services provided by the application developer. A user may invoke an application by providing an audio input (e.g., a voice input) corresponding to a trigger keyword associated with the application. For example, the trigger keyword can be a name of an entity associated with the application developer that developed the application.

It can be technically challenging to correctly verify trigger keywords for applications. For example, some applications may be nonfunctioning or improperly functioning. For example, an improperly functioning application can be an application that includes defects that cause the application to return incorrect information to a user. An improperly functioning application also can be a fraudulent application, which may refer to an application that appears, from the perspective of an end user, to be associated with a trusted entity, but is instead associated with another fraudulent entity. For example, an application developer may attempt to fraudulently impersonate a trusted entity by developing a fraudulent application that can be mistakenly executed by a user who intends to interact with the trusted entity via the application. Thus, when a user interacts with a fraudulent application, the application may invoke services associated with a fraudulent or malicious entity rather than the trusted entity expected by the user. Nonfunctioning or improperly functioning applications can consume computing resources, such as processor capacity and battery life, on the devices on which they execute, such as on a server or on a client computing device. Nonfunctioning or improperly functioning applications can also consume network resources on a computer network linking the computer that access these applications, thereby reducing available bandwidth and increasing network latency. The systems and methods of this disclosure provide techniques for verifying keywords for acoustic-based digital assistant applications, which can help to reduce the computing resources and network resources consumed by nonfunctioning or improperly functioning applications.

The technical solution of this disclosure includes a data processing system that can verify trigger keywords in acoustic-based digital assistant applications in an automated fashion and with a high degree of accuracy. An application developer can use a computing device to submit a request to generate or provide an application. The request can include an identifier for a declared entity associated with the application, as well as a corresponding uniform resource locator (URL) or other form of resource locator or resource identifier. The data processing system can receive the request from the application developer computing device. The data processing system can identify a set of hypertext transfer protocol (HTTP) links (or any other types of protocols or links) that refer to the URL included in the request. For example, the set of links can be links that are publicly available or accessible, such as links embedded in Internet web pages. The data processing system can retrieve the set of links from an index of web pages, which may be maintained by one or more remote servers.

The data processing system can compare the identified set of links to the identifier included in the request to determine whether the request is fraudulent. For example, each link can include or can be associated with a target URL and a text component. The text component can be a string of characters. For example, the character string for a link can be or can correspond to text that is displayed on a web page rendered in a web browser to represent the link visually. The data processing system can process or parse the character string for each link in the identified set of links to determine whether the character string for each link includes a reference to the identifier provided by the application developer computing device with the request. The data processing system can attempt to match at least a portion of the character string of each link with at least a portion of the identifier. The data processing system can also determine one or more alternate identifiers. For example, an alternate identifier can be an identifier that refers to the same entity as the identifier provided by the application developer computing device as part of the request. Thus, the data processing system can determine whether each link includes an identifier or an alternate identifier referring to the same entity. After each of the links is processed in this manner, the data processing system can determine a subset of the links whose character strings include a reference to the identifier provided by the application developer computing device as part of the request.

The data processing system can use the identified subset of links to verify the request from the application developer computing device. For example, the data processing system can determine a match level between the URL and the identifier received in the request from the application developer computing device. A higher or stronger match level can indicate a greater likelihood of a legitimate (e.g., non-fraudulent) request, while a lower or weaker match level can indicate a greater likelihood that the request received from the application developer computing device is fraudulent. The data processing system can determine the match level based in part on the subset of links that were identified as including a reference to the identifier (or an alternate identifier that refers to the same declared entity) of the request received from the application developer computing device.

The data processing system can determine a verification status of the request received from the application developer computing device based on the match level. For example, the data processing system can compare the match level to one or more policies or to one or more threshold values to determine the verification status. The verification status can be a binary status indicating whether the request received from the application developer computing device is approved or verified. The data processing system can cause a trigger keyword to be associated with the software application responsive to verifying the request. As a result of this association, a user can invoke the software application by providing an audio input corresponding to the trigger keyword. The trigger keyword can be or can include the declared entity or a variation thereof. Thus, when the user provides the audio input corresponding to the declared entity, the user can invoke the application that has been verified as legitimate (e.g., not fraudulent).

The data processing system can also determine that the request received from the application developer computing device is not verified based on the match level. For example, the data processing system can determine that the match level does not satisfy one or more policies or one or more threshold values, and can therefore reject the request received from the application developer computing device as not verified. A non-verified request can correspond to a request having a relatively higher degree of likelihood of being fraudulent (e.g., compared with a verified request), based on the match level of the request. In response to determining that the request is not verified, the data processing system can prevent the trigger keyword from being associated with the software application. As a result, when a user provides an audio input corresponding to the trigger keyword, the data processing system will not cause the application to be invoked. Thus, by automatically determining whether a trigger keyword should be verified for an application, the systems and methods of this disclosure can reduce the number of nonfunctioning or improperly functioning applications that are executed in response to unverified trigger keywords. By limiting execution of nonfunctioning or improperly functioning applications, the systems and methods of this disclosure reduce the computing resources, such as processor capacity and electrical power usage, dedicated to such nonfunctioning or improperly functioning applications, while also increasing available network bandwidth and reducing latency in computer networks that would otherwise be consumed by nonfunctioning or improperly functioning applications.

FIG. 1 illustrates an example system 100 to verify trigger keywords in acoustic-based digital assistant applications. The system 100 can include application delivery infrastructure. The system 100 can include an online application store or marketplace. The system 100 can include a data processing system 102. The data processing system 102 can communicate with one or more of an application developer device 160, a third-party device 162, or a client computing device 140 via network 105. The system 100 can also communicate with other devices, such as content provider devices or digital surface devices.

The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or URLs that can be presented, output, rendered, or displayed on at least one client computing device 140, such as a laptop, desktop, tablet, digital assistant device, smart phone, wearable device, portable computers, or speaker. For example, via the network 105 a user of the client computing device 140 can access information or data provided by the data processing system 102 or application developer device 160.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 140. For example, via the network 105 a user of the client computing device 140 can access information or data provided by the data processing system 102 or the application developer device 160.

The network 105 can be any type or form of network and can include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 can include a wireless link, such as an infrared channel or satellite band. The topology of the network 105 can include a bus, star, or ring network topology. The network can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data can be transmitted via different protocols, or the same types of data can be transmitted via different protocols.

The system 100 can include at least one data processing system 102. The data processing system 102 can include at least one logic device such as a computing device having a processor to communicate via the network 105, for example with the client computing device 140 or the application developer device 160 or other networked device or third-party device 162. The data processing system 102 can include at least one computation resource, server, processor, or memory. For example, the data processing system 102 can include a plurality of computation resources or servers located in at least one data center. The data processing system 102 can include multiple, logically-grouped servers and can facilitate distributed computing techniques. The logical group of servers can be referred to as a data center, a server farm, or a machine farm. The servers can also be geographically dispersed. A data center or machine farm can be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device 162. The third-party device 162 can include at least one logic device such as a computing device having a processor to communicate via the network 105, for example with the computing device 140, the data processing system 102, or the application developer device 160. The third-party device 162 can include at least one computation resource, server, processor or memory. For example, third-party device 162 can include a plurality of computation resources or servers located in at least one data center.

The third-party device 162 can provide audio-based digital components for presentation or display by the client computing device 140 as an audio output digital component. The digital component can include an offer for a good or service, such as a voice based message that states: "Would you like me to order you a taxi?" For example, the third-party device 162 can include memory to store a series of audio digital components that can be provided in response to a voice based query. The third-party device 162 can also provide audio based digital components (or other digital components) to the data processing system 102 where they can be stored in the data repository 118. The data processing system 102 can select the audio digital components and provide (or instruct the third-party device 162 to provide) the audio digital components to the client computing device 140. The audio based digital components can be exclusively audio or can be combined with text, image, or video data.

The third-party device 162 can include, interface with, or otherwise communicate with the data processing system 102. The third-party device 162 can include, interface, or otherwise communicate with the client computing device 140. The third-party device 162 can include, interface, or otherwise communicate with the computing device 140, which can be a mobile computing device. The third-party device 162 can include, interface, or otherwise communicate with the application developer device 160. For example, the third-party device 162 can provide a digital component to the client computing device 140 for execution by the client computing device 140. The third-party device 162 can provide the digital component to the data processing system 102 for storage by the data processing system 102. The third-party device 162 can provide rules or parameters relating to the digital component to the data processing system 102.

The client computing device 140 can download an application developed by the application developer device 160. The client computing device 140 can download the application from the data processing system 102 via the network 105. The client computing device can download the application from the application delivery component 110. The client computing device 140 can install the application. The client computing device 140 can execute the application. The client computing device 140 can execute, launch, trigger or otherwise access or use the application responsive to a user input or trigger event or condition. The application can include a front-end component and a back-end component. The client computing device 140 can execute or provide the front-end component of the application, while the data processing system 102 or application developer device 160 provides a back-end component of the application.

The client computing device 140 can include, interface, or otherwise communicate with at least one sensor 144, transducer 146, audio driver 148, or pre-processor 150. The client computing device 140 can include a light source 142 or display device 152, such as a light indicator, light emitting diode ("LED"), organic light emitting diode ("OLED"), or other visual indicator to provide a visual or optic output. The sensor 144 can include, for example, an ambient light sensor, proximity sensor, temperature sensor, accelerometer, gyroscope, motion detector, GPS sensor, location sensor, microphone, or touch sensor. The transducer 146 can include a speaker or a microphone. The audio driver 148 can provide a software interface to the hardware transducer 146. The audio driver can execute the audio file or other instructions provided by the data processing system 102 to control the transducer 146 to generate a corresponding acoustic wave or sound wave. The pre-processor 150 can include a processing unit having hardware to detect a keyword and perform an action based on the keyword. The pre-processor 150 can filter out one or more terms or modify the terms prior to transmitting the terms to the data processing system 102 for further processing. The pre-processor 150 can convert the analog audio signals detected by the microphone into a digital audio signal, and transmit one or more data packets carrying the digital audio signal to the data processing system 102 via the network 105. In some cases, the pre-processor 150 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 140 can be associated with an end user that enters voice queries as audio input into the client computing device 140 (via the sensor 144) and receives audio output in the form of a computer generated voice that can be provided from the data processing system 102 (or the application developer device 160 or the third-party device 162) to the client computing device 140, output from the transducer 146 (e.g., a speaker). The computer generated voice can include recordings from a real person or computer generated language.

The client computing device 140 (or computing device, or client device, or digital device) may or may not include a display. For example, the client computing device 140 can include limited types of user interfaces, such as a microphone and speaker. In some cases, the primary user interface of the computing device 140 can be a microphone and speaker, or voice interface. For example, the primary user interface of the client computing device 140 can include a voice-based or audio-based user interface. The client computing device 140 can include a display and have the primary user interface be voice-based or audio-based. The primary user interface of the client computing device 140 can be conversational. A conversational user interface can refer to a user interface that is at least in part driven or facilitated by a natural language processor ("NLP") component 106 of the data processing system 102.

The data processing system 102 can include a content placement system having at least one computation resource or server. The data processing system 102 can include, interface, or otherwise communicate with at least one interface 104. The data processing system 102 can include, interface, or otherwise communicate with at least one NLP component 106. The data processing system 102 can include, interface, or otherwise communicate with at least one direct action application programming interface ("API") 108. The interface 104, NLP component 106 and direct action API 108 can provide a conversational API or digital action API 108 can provide a conversational API or digital assistant functionality. The conversational API or digital assistant can communicate or interface with one or more voice-based interfaces or various digital assistant devices or surfaces in order to provide data or receive data or perform other functionality.

The data processing system 102 can include, interface, or otherwise communicate with at least one application delivery component 110. The data processing system 102 can include, interface, or otherwise communicate with at least one request management component 112. The data processing system 102 can include, interface, or otherwise communicate with at least one link management component 114. The data processing system 102 can include, interface, or otherwise communicate with at least one request verification component 116.

The interface 104, NLP component 106, direct action API 108, application delivery component 110, request management component 112, link management component 114, and request verification component 116 can each include at least one processing unit or other logic device such as programmable logic array engine, or module to communicate with the data repository 118 or other database. The interface 104, NLP component 106, direct action API 108, application delivery component 110, request management component 112, link management component 114, request verification component 116, and data repository 118 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of client computing devices 140 (or computing device or digital assistant device). A user of a client computing device 140 or mobile computing device can affirmatively authorize the data processing system 102 to obtain network activity information corresponding to the client computing device 140 or mobile computing device. For example, the data processing system 102 can prompt the user of the computing device 140 for consent to obtain one or more types of network activity information. The client computing device 140 can include a mobile computing device, such as a smartphone, tablet, smartwatch, or wearable device. The identity of the user of the client computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

The data processing system 102 can interface with a third-party device 162. The third-party device 162 can include or refer to a device of a content provider. The content provider can establish an electronic content campaign. The electronic content campaign can be stored as content data in the data repository 118. An electronic content campaign can refer to one or more content groups that correspond to a common theme. A content campaign can include a hierarchical data structure that includes content groups, digital component data objects, and content selection criteria. To create a content campaign, the content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 152 of the client computing device 140, or audible via a speaker 136 of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but can have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and can further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 140 or display device 152 of the computing device 140. Rendering can include displaying the digital component on a display device, or playing the digital component via a speaker of the computing device 140. The data processing system 102 can provide instructions to a computing device 140 to render the digital component object. The data processing system 102 can instruct the computing device 140, or an audio driver 148 of the computing device 140, to generate audio signals or acoustic waves.

The data repository 118 can include one or more local or distributed databases, and can include a database management system. The data repository 118 can include computer data storage or memory and can store one or more of application data 120, verification data 122, or policies 124, among other data. The data repository 118 can store the application data 120, the verification data 122, or the policies 124 in one or more data structures, databases, data files, indexes, or other type of data storage.

The application data 120 can include information about an application. The application data 120 can include information about an application submitted by an application developer device 160. The application data 120 can include metadata associated with an application. Application data 120 can include, for example, a title of an application, short description, detail description, version identifier, entities, actions, intents, compatibility information, size, type of application, category of the application, among other information. Application data 120 can include a unique identifier of the application, such as an alphanumeric identifier. Application data 120 can include information about the application developer that provided or submitted the application.

The application data 120 can also include information relating to a declared entity of a developer of the application, which can be an entity associated with a user of the application developer device 160. The information relating to the declared entity can be a word, a phrase, a name, or any other type of information identifying the declared entity. The declared entity can be an entity with which a user of the application developer device 160 asserts an affiliation. The declared entity can be a business, a brand, or a web-based service. The information relating to the declared entity can be referred to in this disclosure as an identifier. The application data 120 for an application can store an association between the application and the identifier. The application data 120 can also include one or more URLs for the application. For example, a URL can be an address of a website that provides a service associated with the application. The application can interface with, access, or otherwise retrieve information from a server device (e.g., the server 170) having an address that corresponds to the URL for the application. The URL can be a URL of a website associated with the user of the application developer device 160. For example, the URL can be a URL of a website associated with a company that employs the user of the application developer device 160. Thus, there can be an association between the identifier of the application (e.g., the declared entity) and the URL of the application. For example, the identifier can include a word or phrase that matches or corresponds to at least a portion of the text of the URL, or the URL can include a word or phrase that matches or corresponds to at least a portion of the identifier.

In some implementations, the application data 120 can include a resource identifier different from a URL. For example, the application data 120 can include a uniform resource identifier (URI). A URI can be or include a string of characters that identifies a particular networked resource. The networked resource can be any resource accessible via a computer network, such as the network 105. The URI can be formatted according to a syntax associated with a particular protocol. The syntax can be a syntax associated with a web address. That is, the URI may be or may include a URL. The URI can also be formatted according to a different protocol. For example, the URI can be formatted as a uniform resource name (URN) or any other format for a resource identifier. The URI can be a URI of a networked resource associate with the user of the application developer device 160. For example, the URI can be a URI of a networked resource associated with a company that employs the user of the application developer device 160. Thus, there can be an association between the identifier of the application (e.g., the declared entity) and the URI of the application.

The verification data 122 can include data relating to a verification status of an application (e.g., an application included in the verification data 122) or associated with a request to generate an application. Such a request can be received from the application developer device 160. The verification status of an application or a request can indicate whether the declared entity provided by the application developer device 160 for an application is determined to match with or correspond to a URL for the application that is also provided by the application developer device 160. The verification status of an application or a request can be a binary value, which can indicate either that the application or request is verified or that the application or request is not verified. For example, the data processing system 102 can determine that the declared entity of an application provided by the application developer device 160 does not match a URL of the application provided by the application developer device 160. The data processing system 102 can then store verification data 122 to indicate that the application or request is not verified (e.g., is denied or rejected). The verification data 122 can also include information that the data processing system 102 can use to determine the verification status of an application or a request to generate an application. For example, the verification data 122 can include a set of links that point to the URL provided by the application developer device 160. A link can be considered as pointing to a URL when the link includes the URL as a target. A link can be an HTTP link to a web-based resource, such as a web page. A link can also be formatted in a different manner. For example, a link can be any data or representation of data that points to, refers to, or identifies a networked resource. A link can be formatted according to a markup language. For example, a link can be formatted using hypertext markup language (HTML). A link can also be formatted using extensible markup language (XML). A link can include any reference mechanism for referring to data or other electronic resources accessible via a computer network. A link can be anchor link bound to a particular portion of a networked resource, such as a specific section of a web-based document. A link can be download link which causes a file to be downloaded upon selection of the link. A link can be email link that causes an email program to be launched or executed upon selection of the link.

A link can also include a character string. The character string for a link can be the text that is displayed to depict the link visually when the link is rendered in a web browser on a computing device, such as the client computing device 140. The character string for a link can be or can include the text corresponding to the URL, but this need not be the case. For example, the character string for a link can also include additional or different text than the text of the target URL of the link.

Referring again to FIG. 1, each policy 124 can be or can include one or more rules, heuristics, instructions, or other information that can be used by the data processing system 102 to determine a verification status of a request to generate an application, which can be received from the application developer device 160. The data processing system 102 can determine the verification status of a request based on identifying a set of the links that point to the URL provided by the application developer device 160. The data processing system 102 can identify such links using an index or other database or collection of web-based links. Each link of the set of links can include a target that corresponds to the URL. The set of links can also include links having a target that corresponds to a subdomain associated with URL. For example, the URL can be a top level domain, and links that include targets to related subdomains can also be included in the set of links. Each link of the set of links can also include link text. The link text can be a character string. For example, the link text for a link can be a set of characters that is displayed in a web browser when the link is rendered on a web page within the web browser.

The data processing system 102 can parse the link text for each link of the set of links to determine a subset of the links whose link text refers to the identifier of the application. The policies 124 can include rules, heuristics, or instructions for determining the verification status of a request from an application developer device 160 based on the identified subset of links. For example, the data processing system 102 can compare the subset of links to a threshold or other criteria based on one or more of the policies 124 to determine whether the request should be verified. A threshold can be a number of links (e.g., a minimum number) included in the subset of links. A threshold can be a percentage. For example, the data processing system 102 can determine the percentage of the total number of links having a target that corresponds to the URL received from the application developer device 160 that is represented by the subset of links, and that percentage can be compared with a predetermined percentage specified by one or more of the policies 124. The criteria for determining whether a request is verified can be dynamic. The data processing system 102 can store any number of policies 124, and can select a particular one of the policies 124 for identifying criteria to determine a verification status of a request based on various characteristics on the request or the application. For example, a threshold specified by a policy 124 can be based on a type of the application, a risk associated with the application, a popularity of the URL provided by the application developer device 160, or any other characteristics of the request of the application.

The data processing system 102 can include an interface 104 (or interface component) to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 140, application developer device 160, or third-party device 162 via network 105.

The data processing system 102 can interface with an application, script or program installed at the client computing device 140, such as an app to communicate input audio signals to the interface 104 of the data processing system 102 and to drive components of the local client computing device to render output audio signals. The data processing system 102 can receive data packets or one or more other signals that include or identify an audio input signal.

The data processing system 102 can include an NLP component 106. For example, the data processing system 102 can execute or run the NLP component 106 to receive or obtain the audio signal and parse the audio signal. For example, the NLP component 106 can provide for interactions between a human and a computer. The NLP component 106 can implement techniques for understanding natural language and allowing the data processing system 102 to derive meaning from human or natural language input. The NLP component 106 can implement techniques based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 can convert the audio input signal into recognized text by comparing the input signal against a stored, representative set of audio waveforms (e.g., in the data repository 118) and choosing the closest matches. The set of audio waveforms can be stored in data repository 118 or other database accessible to the data processing system 102. The representative waveforms are generated across a large set of users, and then can be augmented with speech samples from the user. After the audio signal is converted into recognized text, the NLP component 106 matches the text to words that are associated, for example via training across users or through manual specification, with actions that the data processing system 102 can serve. Aspects or functionality of the NLP component 106 can be performed by the data processing system 102 or the client computing device 140. For example, a local NLP component can execute on the client computing device 140 to perform aspects of converting the input audio signal to text and transmitting the text via data packets to the data processing system 102 for further natural language processing.

The audio input signal can be detected by the sensor 144 or transducer 146 (e.g., a microphone) of the client computing device 140. Via the transducer 146, the audio driver 148, or other components the client computing device 140 can provide the audio input signal to the data processing system 102 (e.g., via the network 105) where it can be received (e.g., by the interface 104) and provided to the NLP component 106 or stored in the data repository 118.

The client computing device 140 can include an audio driver 148, a transducer 146, a sensor 144 and a pre-processor 150. The sensor 144 can receive or detect an input audio signal (e.g., voice input). The pre-processor 150 can be coupled to the audio driver, the transducer, and the sensor. The pre-processor 150 can filter the input audio signal to create a filtered input audio signal (e.g., by removing certain frequencies or suppressing noise). The pre-processor 150 can convert the filtered input audio signal to data packets (e.g., using a software or hardware digital-to-analog converter). In some cases, the pre-processor 150 can convert the unfiltered input audio signal to data packets and transmit the data packets to the data processing system 102. The pre-processor 150 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The data processing system 102 can provide, to the pre-processor 150 of the client computing device 140, a status. The client computing device 140 can receive the indication of the status. The audio driver can receive the indication of the status of the profile, and generate an output signal based on the indication. The audio driver can convert the indication to an output signal, such as sound signal, or acoustic output signal. The audio driver can drive the transducer 146 (e.g., speaker) to generate sound based on the output signal generated by the audio drive.

In some cases, the client computing device 140 can include a light source 142. The light source can include one or more LEDs, lights, display, or other component or device to provide an optical or visual output. The pre-processor 150 can cause the light source to provide a visual indication corresponding to the status. For example, the visual indication can be a status indicator light that turns on, a change in color of the light, a light pattern with one or more colors, or a visual display of text or images.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the client computing device 140 to convert the subsequent audio input into text and transmit the text to data processing system 102 for further processing. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I want a ride to the airport." The NLP component 106 can apply a semantic processing technique, or other natural language processing technique, to the data packets comprising the sentence to identify the request or trigger phrases "want a ride" and "airport". The NLP component 106 can further identify multiple trigger keywords, such as want and ride. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "I", "could", "get", "someone", "that", "could", or "help". By filtering out these terms, the NLP component 106 can more accurately and reliably identify the trigger keywords, such as "go to the airport" and determine that this is a request for a taxi or a ride sharing service.

In some cases, the NLP component 106 can determine that the data packets carrying the input audio signal includes one or more requests. For example, the input audio signal can include the sentence "1 want to purchase an audiobook and monthly subscription to movies." The NLP component 106 can determine this is a request for an audio book and a streaming multimedia service. The NLP component 106 can determine this is a single request or multiple requests. The NLP component 106 can determine that this is two requests: a first request for a service provider that provides audiobooks, and a second request for a service provider that provides movie streaming. In some cases, the NLP component 106 can combine the multiple determined requests into a single request, and transmit the single request to a third-party device 162. In some cases, the NLP component 106 can transmit the individual requests to another service provider device, or separately transmit both requests to the same third-party device 162.

The data processing system 102 can include a direct action API 108 designed and constructed to generate, based on the trigger keyword, an action data structure responsive to the request. The direct action API 108 can generate the action data structure to cause an application to perform the corresponding action. The direct action API 108 can transmit the action data structure to the application installed on the client computing device 140 to cause the client computing device 140 to perform the corresponding action or initiate an action. The action data structure generated by the direct action API 108 can include a deep link for an application installed on the client computing device 140. The application installed on the client computing device 140 can then perform the action or communicate with the application developer device 160 or a third-party device 162 to perform the action.

Processors of the data processing system 102 can invoke the direct action API 108 to execute scripts that generate a data structure to provide to an application installed on the client computing device 140, an application developer device 160, or a third-party device 162 or other service provider to obtain a digital component, order a service or product, such as a car from a car share service or an audiobook. The direct action API 108 can obtain data from the data repository 118, as well as data received with end user consent from the client computing device 140 to determine location, time, user accounts, logistical or other information to allow the third-party device 162 to perform an operation, such as reserve a car from the car share service. Using the direct action API 108, the data processing system 102 can also communicate with the third-party device 162 to complete the conversion by in this example making the car share pick up reservation.

The direct action API 108 can execute a specified action to satisfy the end user's intention, as determined by the data processing system 102. Depending on the action specified in its inputs and the parameters or rules in the data repository 118, the direct action API 108 can execute code or a dialog script that identifies the parameters required to fulfill a user request.

The direct action API 108 can execute an application to satisfy or fulfill the end user's intention. Such code can look-up additional information, e.g., in the data repository 118, such as the name of a home automation service, or third-party service, or it can provide audio output for rendering at the client computing device 140 to ask the end user questions such as the intended destination of a requested taxi. The direct action API 108 can determine parameters and can package the information into an action data structure, which can then be sent to another component such as the application delivery component 110 to be fulfilled.

The direct action API 108 can receive an instruction or command from the NLP component 106, or other component of the data processing system 102, to generate or construct the action data structure. The direct action API 108 can determine a type of action in order to select a template stored in the data repository 118. The actions can be fulfilled by application provided by the application delivery component 110 and submitted by an application developer device 160. The application can perform or facilitate the performance of the action. Example types of actions can include, for example, watch action, listen action, read action, navigation action, or weather action. Types of actions can include or can provide, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 106 can parse the input audio signal to identify a request and a trigger keyword corresponding to the request, and provide the request and trigger keyword to the direct action API 108 to cause the direct action API to generate, based on the trigger keyword, a first action data structure responsive to the request. The direct action API 108, upon identifying the type of request, can access the corresponding template from a template repository (e.g., data repository 118). Templates can include fields in a structured data set that can be populated by the direct action API 108 to further the operation that is requested via input audio detected by the client computing device 140 (such as the operation of sending a taxi to pick up an end user at a pickup location and transport the end user to a destination location). The direct action API 108, or client computing device 140, can launch or trigger an application to fulfill the request in the input audio. For example, a car sharing service application can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 144 of the computing device 140 or a user interface of the device 140. For example, the direct action API 108 can detect the source location using a location sensor, such as a GPS sensor. The direct action API 108 can obtain further information by submitting a survey, prompt, or query to the end of user of the computing device 140. The direct action API can submit the survey, prompt, or query via interface 104 of the data processing system 102 and a user interface of the computing device 140 (e.g., audio interface, voice-based user interface, display, or touch screen). Thus, the direct action API 108 can select a template for the action data structure based on the trigger keyword or the request, populate one or more fields in the template with information detected by one or more sensors 144 or obtained via a user interface, and generate, create or otherwise construct the action data structure to facilitate performance of an operation by the third-party device 162.

The data processing system 102 can include, interface with or otherwise access an application delivery component 110. The application delivery component 110 can also be separate from the data processing system 102. For example, the application delivery component 110 can be a separate system or server from the data processing system 102. The data processing system 102 can communicate with the application delivery component 110 via network 105.

The application delivery component 110 can receive an application submitted by or generated based in part on inputs provided by the application developer device 160. The application delivery component 110 can maintain one or more versions of an application. The application delivery component 110 can transmit the application to a client computing device 140. The application delivery component 110 can download the application onto a client computing device 140. The application delivery component 110 can maintain an online application store or marketplace. The application delivery component 110 can manage or maintain accounts for application developer devices 160 or client computing devices 140. The application delivery component 110 can maintain profiles for the accounts. The accounts or profiles can be associated with a unique identifier. The account can include a financial account or token account that can be used to purchase or subscribe to application. The application delivery component 110 can prompt a user of a client computing device 140 to pay for an application by providing electronic account information, such as an electronic financial account.

The data processing system 102 can include, interface with or otherwise access a request management component 112. The request management component 112 can receive, process, and manage a request from the application developer device 160. The request can be or can include a request for the data processing system 102 to generate an application. The request can also be or can include a request for the data processing system 102 to associate a trigger word or phrase with the application. The request management component 112 can communicate with the application developer device 160 to solicit or otherwise prompt the application developer device 160 to provide the request. For example, the request management component 112 can provide an interface (e.g., a graphical user interface) for display on the application developer device 160. A user of the application developer device 160 can interact with the interface to provide the request. The interface can provide one or more selectable options that a user of the application developer device 160 can select when providing the request. For example, the user of the application developer device 160 can be enabled to indicate an identifier along with the request. The identifier can be a character string (e.g., a series of text-based characters) that the user of the application developer device 160 wishes to associate with the application. The identifier can correspond to an entity associated with the application developer device 160, such as a company or a web-based service. By providing the identifier along with the request, the user of the application developer device 160 can declare to the data processing system 102 that the identifier is associated with the application. Thus, the identifier can also be referred to in this disclosure as a declared entity.

The user of the application developer device 160 can also be enabled to provide a URL along with the request. The request management component 112 can receive the URL. The URL can correspond to an address of a website that provides a service associated with the application. The URL can be a URL of an entity associated with the application developer device 160, such as the declared entity that corresponds to the identifier included in the request received from the application developer device 160. The URL can be a URL of a website associated with a company that employs the user of the application developer device 160. The request management component 112 can also process, parse, or otherwise extract information the request. For example, the request management component 112 can process the request to extract the identifier and the URL that are included in the request. The user of the application developer device 160 also can be enabled to provide a different resource identifier along with the request. For example, the user of the application developer device 160 may instead provide a URI. A URI can be a string of characters that identifies a particular networked resource. The networked resource can be any resource accessible via a computer network, such as the network 105.

The data processing system 102 can include, interface with or otherwise access a link management component 114. The link management component 114 can identify a set of links based on the request. For example, the link management component 114 can identify a set of links each referring to the URL that was included in the request received by the request management component 112 from the application developer device 160. The link management component 114 can identify the set of links based determining that each link includes a target that corresponds to the URL of the request. The link management component 114 can also determine one or more alternate URLs. An alternate URL can be a URL that is related to the URL received as part of the request. For example, a related URL can be a URL to a related website or a URL corresponding to a subdomain of a top-level domain represented by the URL received as part of the request. The link management component 114 can identify the set of links to include links that refer to one or more alternate URLs.

The link management component 114 can identify the set of links using information stored on a remote computing device. For example a remote computing device, such as the server 170, can maintain an index of web pages. The link management component 114 can transmit a request to the server 170 to request the set of links having the URL (or a related URL) as a target. Such an index also can be maintained locally on the data processing system 102. For example, the data repository 118 or another memory element of the data processing system 102 can store information corresponding to an index of web pages. In instances in which the link management component 114 requests the set of links from a remote computing device, the link management component 114 can transmit the request using one or more remote procedure calls (RPCs). For example, the link management component 114 can structure the request for a set of links having targets that correspond to the URL provided by the application developer device 160 as an RPC, which can be provided to the remote computing device. The remote computing device can identify the set of links and can respond to the RPC by returning the set of links to the link management component 114. The remote computing device can be or can include the server 170. The remote computing device can also be or can include a proxy device. The server 170 can implement such a proxy device, or can be replaced in the diagram shown in FIG. 1 with a proxy device. Thus, in this disclosure, the server 170 can also be referred to as a proxy 170.

After identifying the set of links having targets that correspond to the URL provided by the application developer device 160, the link management component 114 can also identify a subset of the links that have a respective character string that includes the identifier (e.g., declared entity) provided by the application developer device 160. For example, each link in the set of links identified by the link management component 114 can include a target, which can be a web address to which the link refers, as well as a character string or link text, which can be any textual information associated with the link. The character string can be text formatted according to a markup language, such as HTTP, that causes the character string to be displayed as a visual representation of the link when the link is rendered in a web browser executing on a computing device, such as the client computing device 140. Thus, when a user clicks on or otherwise selects the character string, the web browser can access the website or other resource corresponding to the target of the link. The character string for a link can also be referred to as link text in this disclosure.

The link management component 114 can identify the subset of links as those links of the set whose link text includes, relates to, refers to, or is otherwise associated with the identifier provided by the application developer device 160 as part of the request. The link management component 114 can parse the respective character string. Parsing a character string can include processing or analyzing the character string to extract information from the character string. For example, the link management component 114 can parse the character string of a link to identify each separate word of the character string. The link management component 114 can also parse a character string to determine each separate character of the character string. The link management component 114 can parse a character string by applying a language processing technique. For example, the link management component 114 can apply a natural language processing technique (e.g., provided by the natural language processor component 106) to a character string to determine information such as a topic, a subject, or a sentiment of the character string.

Based on the parsed character string for a given link, the link management component 114 can determine whether the identifier provided by the application developer device 160 is included in or referred to in the character string. For example, the link management component 114 can compare the identifier to each individual word of the character string for a link to determine a match. The match can be a complete match (e.g., at least one of the words of the character string matches exactly with the identifier) or a partial match. The link can be included as part of the subset of links when a match is determined for the link. The link management component 114 can also include a link as part of the subset of links even when the character string for the link is not a complete match with the identifier. For example, the link management component 114 can determine one or more alternate identifiers. An alternate identifier can be an identifier that differs from the identifier received from the application developer device 160 as part of the request. For example, an alternate identifier can still refer to the same entity as the identifier, but can include a different word or words. An alternate identifier can include an alternate spelling, an alternate name, an abbreviation, etc., for the entity. The link management component 114 can determine a match between an alternate identifier and the character string for a link, even when the character string for the link does not match with the original identifier. By comparing the identifier and any alternate identifiers to the character string for each link of the set of links, the link management component 114 can determine a subset of matching links.

The data processing system 102 can include, interface with, or otherwise access a request verification component 116. The request verification component 116 can determine a verification status for the request received from the application developer device 160. The verification status can be a binary status. For example, the request can be either verified or not verified. The request verification component 116 can determine whether a request is verified based in part on the subset of links identified by the link management component 114. For example, the link management component 114 can compare the subset of links to one or more threshold values. The request verification component 116 can select a threshold value for the comparison based on one of more of the policies 124 stored in the data repository 118. A threshold value can be a percentage, such as a percentage of the plurality of links that are included the subset of matching links identified by the link management component 114. Stated differently, the threshold value can be a minimum required fraction of the links that include the URL received from the application developer device 160 with the request that also include a character string matching the identifier (or an alternate identifier) received from the application developer device 160 with the request. For example, the threshold percentage can be 100%, 20%, 30%, 40%, 50%, 60%, 70%, 80%, or 90%. The threshold value can also be a number, rather than a percentage.

The request verification component 116 can also select a threshold value dynamically. For example, the threshold value can be selected based on other criteria. The criteria can include a type of the application. For example certain types of applications can present a higher degree of risk of fraud than other types. Applications having a higher degree of fraud risk can include applications relating to finance (e.g., banking applications) or any application that can receive or access private or sensitive information from a user. For an application that is determined to present a higher risk, the request verification component 116 can select a higher threshold for verification of the request. The request verification component 116 can also select a threshold value for the comparison based on a popularity of the URL received from the application developer device 160 as part of the request. For example, popularity can be determined based on the total number of links that include the URL as a target. Thus, the request verification component 116 can select a different threshold for a request specifying a more popular URL than for a request specifying a less popular URL. For example, the request verification component 116 can select a higher threshold for requests associated with more popular URLs.

The request verification component 116 can compare the subset of links having link text (e.g., a character string) that matches the identifier or an alternate identifier to the threshold value to determine a match level. The request verification component 116 can determine that the request is verified responsive to determining that the subset of links meets or exceeds the threshold value (e.g., the number of links included in the subset of links is greater than or equal to the threshold value). The request verification component 116 can also determine that the request is not verified, responsive to determining that the subset of links does not meet or exceed the threshold value (e.g., the number of links included in the subset of links is less than the threshold value). A request that is not verified can also be referred to as rejected or denied. The request verification component 116 can store the verification status of the request in the data repository 118, for example as verification data 122.

Figure 2:
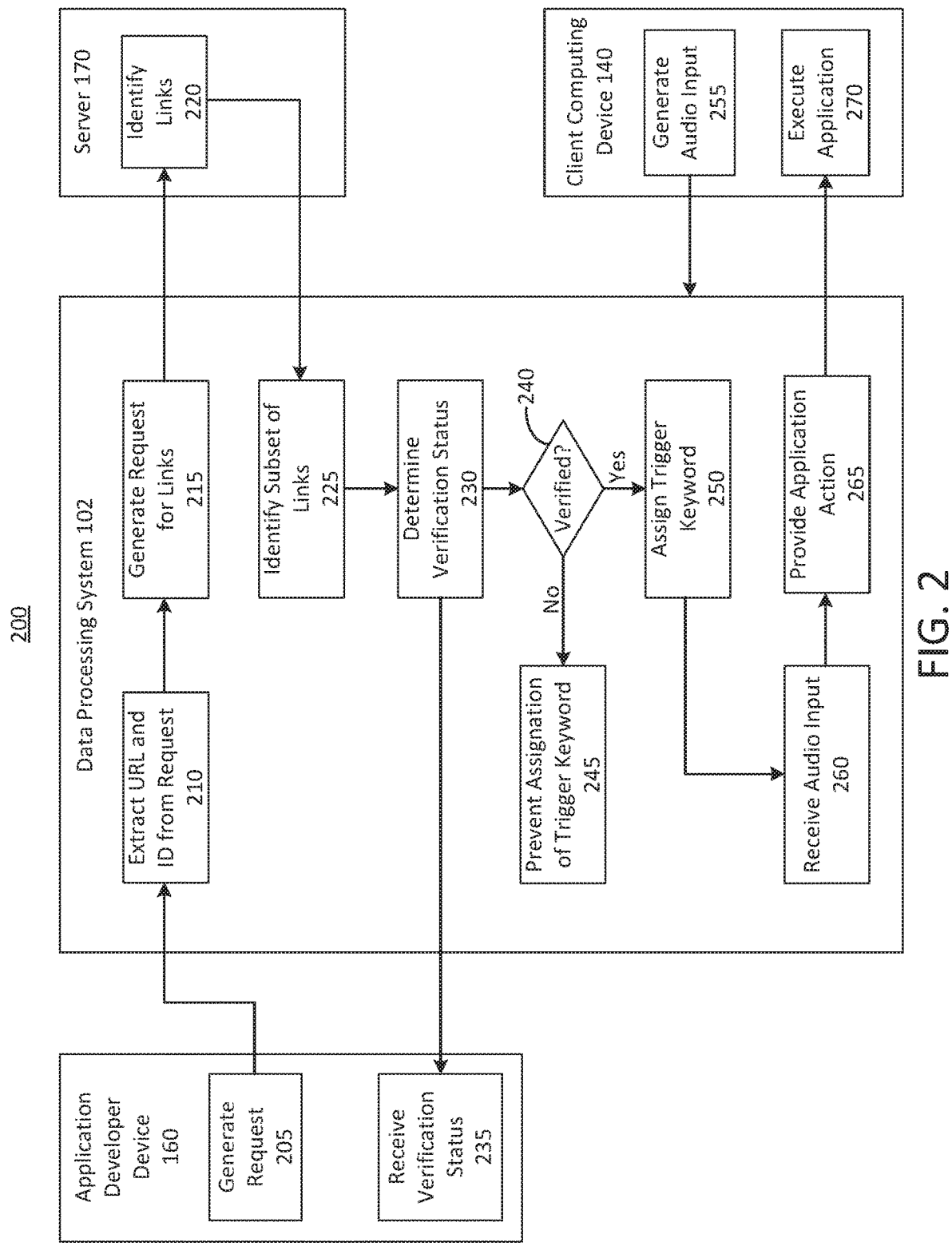
FIG. 2 is an illustration of an example operation of a system to verify trigger keywords in acoustic-based digital assistant applications.

FIG. 2 is an illustration of the operation of a system 200 to verify trigger keywords in acoustic-based digital assistant applications. The system 200 can include one or more components of the system 100 depicted in FIG. 1 or the system 400 depicted in FIG. 4. The system 200 can include a data processing system 102. The data processing system 102 can communicate, interface with, or otherwise interact with an application developer device 160.

At ACT 205, the application developer device 160 can generate a request. The request can be a request for the data processing system 102 to build, generate, or provide a voice-based software application. The request can include information related to the application. For example, the request can include can include an identifier for a declared entity associated with the application, as well as a corresponding uniform resource locator (URL). The URL can be associated with a service provided by the voice-based software application. For example, the URL can be accessed by the voice-based software application when the voice-based software application is subsequently executed by an end user, such as a user of the client computing device 140. The URL also may correspond to a top-level domain of one or more other websites (e.g., subdomains) that are accessed by the voice-based software application when the voice-based software application is subsequently executed by an end user. The identifier can correspond to a trigger keyword that a user of the application developer device 160 wishes to associate with the application. There can be a risk that the application developer device 160 is not actually associated with the declared entity represented by the identifier provided in the request, but is instead attempting to fraudulently impersonate the declared entity. For example, associating an application with a fraudulent declared entity could deceive users into believing that they are interacting with a different entity when they execute the application. Thus, it can be useful for the data processing system 102 to detect and prevent such fraudulent requests.

The data processing system 102 can receive the request from the application developer device 160. The request can be received, for example, by the request management component 112 shown in FIG. 1. At ACT 210, the data processing system 102 or a component thereof, such as the request management component 112, can process the request to determine or extract a URL and an identifier from the request. The URL can be an address of a website or other web-based resource that provides a service associated with the application. The URL can be a URL of a website associated with the user of the application developer device 160. For example, the URL can be a URL of a website associated with a company that employs the user of the application developer device 160. Thus, there can be an association between the identifier of the application (e.g., the declared entity) and the URL of the application. The data processing system 102 can also (or alternatively) process the request to determine a different type of resource identifier, instead of a URL. For example, the data processing system 102 may instead process the request to determine a URI. The URI can be an identifier of any networked resource, which may include one or more websites.

At ACT 215, the data processing system 102 can generate a request for a set of links based on the information extracted from the request. For example, the links requested can be links that point to the URL (or URI or other resource identifier) extracted from the request at ACT 210. Stated differently, the data processing system 102 can generate a request for a set of links that have a target corresponding to the URL of the request received from the application developer device 160. The request can be generated by the link management component 114. The request can be formatted, for example, as an RPC that specifies the URL. The link management component 114 can transmit the request to the server 170, which can be or can include a proxy.

At ACT 220, the server 170 can identify the set of links requested by the data processing system 102 at ACT 215. For example, the server 170 can host or store an index of links. The links can be HTTP links to web pages or other networked resourced. The links can also be formatted in a different manner. For example, the links can be any data or representation of data that points to, refers to, or identifies a networked resource. The links can be formatted according to a markup language. For example, the links can be formatted using hypertext markup language (HTML). At least some of the links can also be formatted using extensible markup language (XML). At least some of the links can each include any reference mechanism for referring to data or other electronic resources accessible via a computer network. At least some of the links can be anchor links bound to a particular portion of a networked resource, such as a specific section of a web-based document. At least some of the links can be download links which cause a file to be downloaded upon selection of the links. At least some of the links can be email links that cause an email program to be launched or executed upon selection of the links. The server 170 can search the index to identify all of the links that have targets that correspond to the URL of the request. The identified links together can form the set of links requested by the data processing system 102. The server 170 can return the identified set of links to the data processing system 102. For example, the set of links can be returned to the data processing system 102 in the format of a response to the request received from the data processing system 102.

At ACT 225, the data processing system 102 can identify a subset of the set of links received from the server 170. The request verification component 116 can determine the subset of links. The subset of links can include links that have link text that matches the identifier extracted from the request in ACT 210. For example, each link can include link text, which can be a character string. The character string for a link can be a set of characters displayed when the link is rendered in a web browser. The request verification component 116 can identify the links to be included in the subset by parsing the character string for each link to determine whether the character string includes at least a portion that matches the identifier. For example, the request verification component 116 can determine a match by determining that the identifier appears as a set of characters in the character string for a link. The request verification component 116 can also determine a partial match. For example, at least a portion of the identifier can appear in the character string for a link, even when the entire identifier does not appear. The request verification component 116 can also determine one or more alternate identifiers. An alternate identifier can be an identifier that is different from the identifier extracted from the request in ACT 210, yet still refers to the same entity as the identifier extracted from the request. For example, an alternate identifier can include an abbreviation or alternate spelling for the entity. The request verification component 116 can determine a match between a link and an alternate identifier, and can therefore add the link to the subset of matching links.

At ACT 230, the data processing system 102 can determine a verification status for the request. The verification status can be determined by the request verification component 116, for example. The request verification component 116 can determine the verification status based on the subset of links determined by the link management component 114 as matching the identifier of the request or an alternate identifier. For example, the request verification component 116 can compare the number of links in the matching subset of links with a total number of links received from the server 170 to determine a match level. The request verification component 116 can determine that the request is verified responsive to determining that the match level meets or exceeds a predetermined threshold value. The request verification component 116 can determine that the request is not verified (e.g., the request is denied or rejected) responsive to determining that the match level does not meet or exceed the predetermined threshold. The request verification component 116 can also provide an indication of the verification status of the request to the application developer device 160. At ACT 235, the application developer device 160 can receive from the data processing system 102 the verification status, so that a user of the application developer device 160 can be notified as the verification status of the request.

At ACT 240, the data processing system 102 can determine whether the request is verified or not, based on the verification status determined at ACT 230. The data processing system 102 can prevent assignation of a trigger keyword with the application at ACT 245, responsive to determining that the request is not verified. For example, the trigger keyword can be the identifier extracted from the request at ACT 210. When a request is not verified, it can indicate a relatively higher degree of likelihood that the user of the application developer device 160 is attempting to fraudulently associate the trigger keyword (e.g., the identifier) with the URL provided in the request. As a result, users who invoke such an application (e.g., using the client computing device 140) can be at greater risk of having the information they provide while interacting with the application used for malicious or fraudulent purposes. By preventing the trigger keyword from being assigned to the application, the data processing system 102 also prevents users from triggering the application by providing the trigger keyword. Therefore, users can be protected from a fraudulent application whose request is not verified.

The data processing system 102 can determine that the request is verified and can respond to that determination by assigning the trigger keyword to the application at ACT 250. The data processing system 102 can receive the application from the application developer device 160. The data processing system 102 can also generate or build at least a portion of the application. Assigning the trigger keyword can include creating an association between the trigger keyword and the application that causes the application to be executed or accessed when an audio input corresponding to the trigger keyword is received, for example from the client computing device 140.

At ACT 255, a user of the client computing device 140 can generate an audio input. The audio input can be a voice input. For example, the user of the client computing device 140 can speak a word or phrase that can be detected by a component of the client computing device 140, such as the sensor 144 or the transducer 146. The audio input can correspond to the trigger keyword for the application associated with the request generated by the application developer device 160 at ACT 205. For example, the trigger keyword can be or can include the identifier that the data processing system 102 extracted from the request at ACT 210, and the audio input generated by the client computing device 140 can correspond to the trigger keyword. The client computing device 140 can transmit the audio input to the data processing system 102. The trigger keyword is not associated with the application and receipt of the audio input will not cause the application to execute, when the data processing system 102 has determined that the request received from the application developer device 160 is not verified at ACT 240. On the other hand, the trigger keyword is associated with the application and receipt of the audio input at ACT 260 can cause the application to execute when the data processing system 102 has determined that the request received from the application developer device 160 is verified at ACT 240.

For example, execution of the application can cause an action associated with the application to be provided at ACT 265. The action can be any response to the trigger keyword or any other input or request provided by the client computing device 140. In this way, the data processing system 102 can cause at least a portion of the application to execute on the client computing device 140 at ACT 270. At least another portion of the application can execute remotely, for example on the data processing system 102 or another computing system remote from the client computing device 140. Thus, the user of the client computing device 140 can interact with the application by providing the audio input corresponding to the trigger keyword when the request has been verified at ACT 240. However, when the request is not verified, the trigger keyword is not associated with the application and the user of the client computing device 140 may not be able to interact with the application by providing the audio input corresponding to the trigger keyword. The user can therefore be prevented from interacting with an application that is determined by the data processing system 102 to have a higher risk of fraud.

Figure 3:
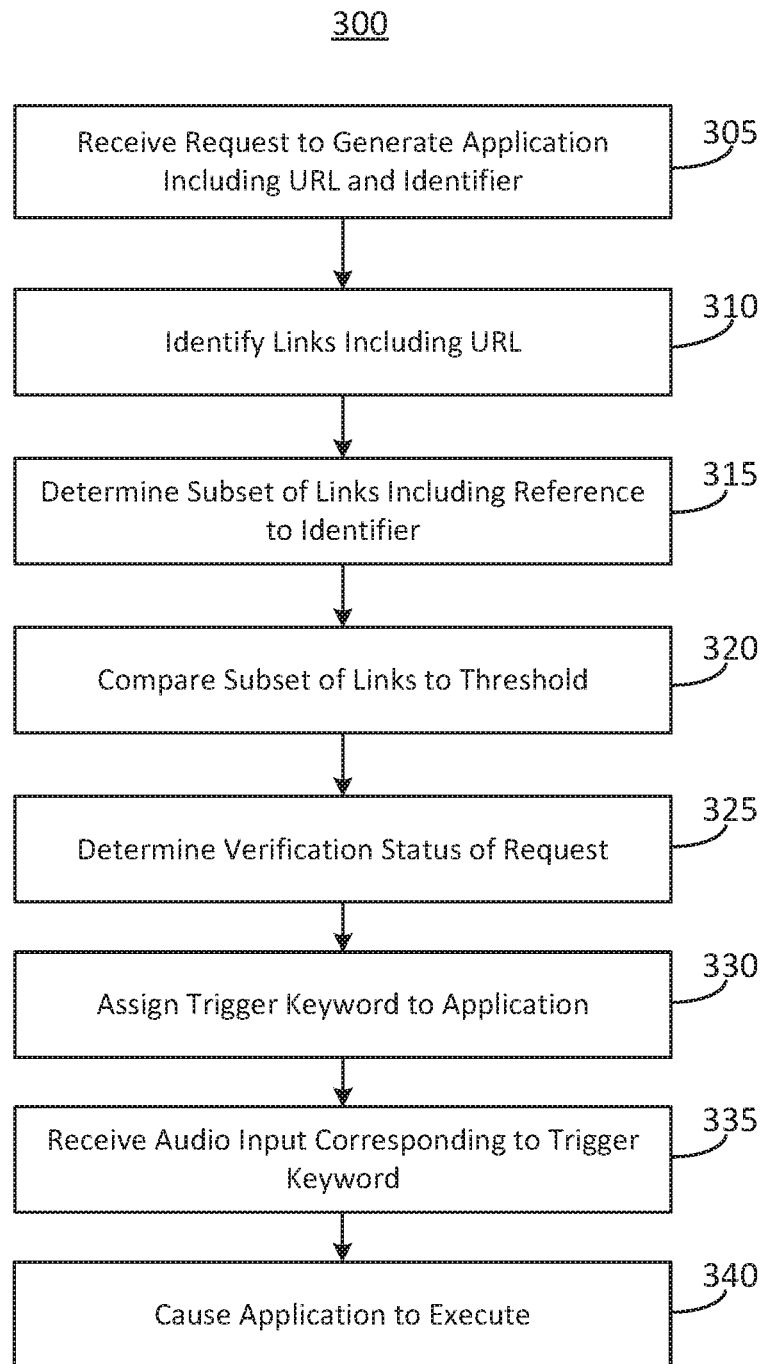
FIG. 3 is an illustration of an example method of verifying trigger keywords in acoustic-based digital assistant applications.

FIG. 3 is an illustration of an example method 300 of verifying trigger keywords in acoustic-based digital assistant applications. The method 300 can be performed by one or more components, systems or elements of the system 100 depicted in FIG. 1, the system 200 depicted in FIG. 2, or system 400 depicted in FIG. 4. For example, the method 300 can be performed by a data processing system such as the data processing system 102 shown in FIG. 1. At ACT 305, the data processing system 102 can receive a request to generate an application. The application can be a voice-based software application. The data processing system 102 can receive the request from the application developer device 160 shown in FIG. 1. The request can include information related to the application. For example, the request can include a URL and an identifier. The identifier can correspond to an entity associated with the application or with the application developer device 160. For example, the identifier can correspond to an entity of which a user of the application developer device 160 is a member, such as an employee. Thus, the identifier can also be referred to in this disclosure as a declared entity. The identifier can serve as a trigger keyword that a user of the application developer device 160 wishes to associate with the application. For example, a trigger keyword can be a keyword that, when provided as an audio input from a computing device such as the client computing device 140, causes execution of the application. There can be a risk that the application developer device 160 (or a user thereof) is not actually associated with the declared entity represented by the identifier, but is instead attempting to fraudulently impersonate the declared entity. For example, associating an application with a fraudulent declared entity could deceive users into believing that they are interacting with a different entity when they execute the application. Thus, it can be useful for the data processing system 102 to detect and prevent such fraudulent requests.

At ACT 310, the data processing system can include a set of links that include the URL provided in the request. For example, the links can be links that refer to or point to the URL. A link can point to a URL when the link includes the URL as a target. The links can be HTTP links that refer to web-based resources or pages. A component of the data processing system 102, such as the request management component 112 or the link management component 114, can extract the URL from the request. The links can be determined by referencing an index of web pages. For example, an index can be hosted on a remote computing device such as the server 170. The data processing system 102 can transmit a request to the remote computing device to cause the remote computing device to return the set of links that include the URL. The request can be formatted as an RPC.

At ACT 315, the data processing system 102 can determine a subset of the links that include a reference to the identifier that was provided in the request from the application developer device 160. Each link can include a respective character string, which can be referred to as link text. A link can be identified as referring to the identifier when its associated link text or character string includes or at least partially matches the identifier. Thus, the data processing system 102 can identify the subset of links to include those links that have link text that matches the identifier extracted from the request. The data processing system 102 can identify the links to be included in the subset by parsing the character string for each link to determine whether the character string includes at least a portion that matches the identifier. For example, the data processing system 102 can compare the characters of the identifier to the characters included in the link text to determine a match. The data processing system 102 can also determine a partial match, such as an instance in which a subset of the characters of the identifier appears in the link text of a link, while the full set of characters of the identifier may not be present. The data processing system 102 can also determine one or more alternate identifiers. An alternate identifier can be an identifier that is different from the identifier included in the request, but which still refers to the same entity as the identifier extracted from the request. For example, an alternate identifier can include an abbreviation or alternate spelling for the entity referred to by the identifier (e.g., the declared entity). The request verification component 116 can determine a match between a link and an alternate identifier, and can therefore add the link to the subset of matching links. After each link has been compared to the identifier (or an alternate identifier) to determine a match, all of the matching links can be included in the subset of links determined in ACT 315.

At ACT 320, the data processing system 102 can compare the subset of links to a threshold. A threshold value for this comparison can be a percentage, such as a percentage of the plurality of links identified in ACT 310 that are also included the subset of links identified at ACT 315. Stated differently, the threshold value can be a minimum fraction of the links that include the URL received from the application developer device 160 with the request that also include a character string matching (or at least partially matching) the identifier (or an alternate identifier) received from the application developer device 160 with the request. The threshold value can also be a number, rather than a percentage. Thus, the number of links included in the subset of links identified at ACT 315 can be compared with the threshold number to determine whether the number of links included in the subset of links satisfies (e.g., meets or exceeds) the threshold number.

The data processing system 102 can select a threshold value for this comparison in a dynamic fashion. For example, the threshold value can be selected based on a variety of criteria. The criteria can include a type of the application associated with the request. For example, certain types of applications can present a higher degree of risk of fraud than other types. Applications having a higher degree of fraud risk can include applications relating to finance (e.g., banking applications) or any application that can receive or access private or sensitive information from a user. For an application that is determined to present a higher risk, the data processing system 102 can select a higher threshold for verification of the request. The data processing system 102 can determine a risk level associated with the request, which can be based on the type of the application or other criteria. The risk level can be a binary risk level (e.g., high risk or low risk). The risk level can also be a numerical value, such as a decimal value between zero and one, or an integer value between 1 and 10 or between 1 and 100. The data processing system 102 can select a threshold for the comparison based in part on the determined risk level. For example, the data processing system 102 can select a higher threshold for higher risk levels, thereby requiring a higher match level for verification of riskier requests.

At ACT 325, the data processing system 102 can determine a verification status of the request. The verification status can be determined based on the comparison performed at ACT 320. For example, the data processing system 102 can compare the subset of links having link text (e.g., a character string) that matches the identifier or an alternate identifier to the threshold value to determine a match level. The data processing system 102 can determine that the request is verified when the subset of links meets or exceeds the threshold value (e.g., the number of links included in the subset of links is greater than or equal to the threshold value). However, when the subset of links does not meet or exceed the threshold value (e.g., the number of links included in the subset of links is less than the threshold value), the data processing system 102 can determine that the request is not verified. A request that is not verified can also be referred to as rejected or denied. The data processing system 102 can store the verification status of the request, for example in the data repository 118. The data processing system 102 can also notify the application developer device 160 of the verification status.

When the request is verified (e.g., as indicated by the determined verification status), the data processing system 102 can assign a trigger keyword to the application at ACT 330. The data processing system 102 can receive at least a portion of the application from the application developer device 160. The data processing system 102 can also generate or build at least a portion of the application itself. Assigning the trigger keyword to the application can include creating an association between the trigger keyword and the application that causes the application to be executed or accessed when an audio input corresponding to the trigger keyword is received, for example from the client computing device 140. Thus, audio data representing the trigger keyword can also be assigned to the application. The data processing system 102 can determine the keyword based on information included in the request received at ACT 305. For example, the data processing system 102 can determine the trigger keyword to be the identifier that was included in the request. The data processing system 102 can store the association between the trigger keyword and the application, for example in the data repository 118. On the other hand, when the request is not verified, the data processing system 102 can prevent the keyword from being associated with the application.

At ACT 335, the data processing system 102 can receive an audio input corresponding to the trigger keyword. The audio input can be received from a computing device such as the client computing device 140. The audio input can indicate that a user of the client computing device 140 wishes to execute, access, or otherwise interact with the application. For example, the user of the client computing device 140 may have downloaded or otherwise obtained the application, or may have access to the application executing at the data processing system 102, and may wish to interact with the application at their client computing device 140 by uttering the trigger keyword. Thus, the computing device 140 can execute the application, or can access the application via a remote computing device that executes the application such as the data processing system 102. The computing device 140 can also access a portion of the application, while a remote computing device such as the data processing system 102 executes another portion of the application. The data processing system 102 can parse the audio input, for example using the natural language processor component 106, to determine that the audio input corresponds to the trigger keyword that was assigned to the application at ACT 330. When the data processing system 102 determines that the audio input corresponds to the trigger keyword, the data processing system 102 can cause the application to execute at ACT 340. For example, the data processing system 102 can cause the application to execute on the computing device (e.g., the client computing device 140) from which the audio input corresponding to the trigger keyword was received. The data processing system 102 can also cause the application to execute on a different computing device, such as the data processing system 102 itself or the server 170. In such an instance, outputs from the application can be provided to the client computing device 140 to allow the client computing device 140 to interact with the application remotely. The data processing system 102 can also cause a portion of the application to execute remotely from the client computing device 140, while another portion of the application can execute on the client computing device 140.

Thus, using the method 300, a user of the client computing device 140 can be able to invoke, access, or execute an application that has previously been evaluated by the data processing system 102 for potential fraud. Because the data processing system 102 can prevent assignation of a trigger keyword with an application based on an associated request not being verified, a user of the client computing device 140 can be protected from invoking such an application by providing a voice input corresponding to the trigger keyword. The data processing system 102 only associates the trigger keyword with the application after the request has been verified, thereby protecting the user of the client computing device 140 from mistakenly interacting with a fraudulent application.

The method 300 also can be repeated any number of times to verify trigger keywords for additional applications. For example, a subsequent request from a developer computing device such as the application developer device 160 can be received by the data processing system 102. The data processing system 102 can perform steps similar to those described above in connection with the method 300. In some instances, the data processing system 102 may determine that the subsequent request is not verified, and may prevent assignation of a trigger keyword with an application corresponding to the subsequent request as a result.

Figure 4:
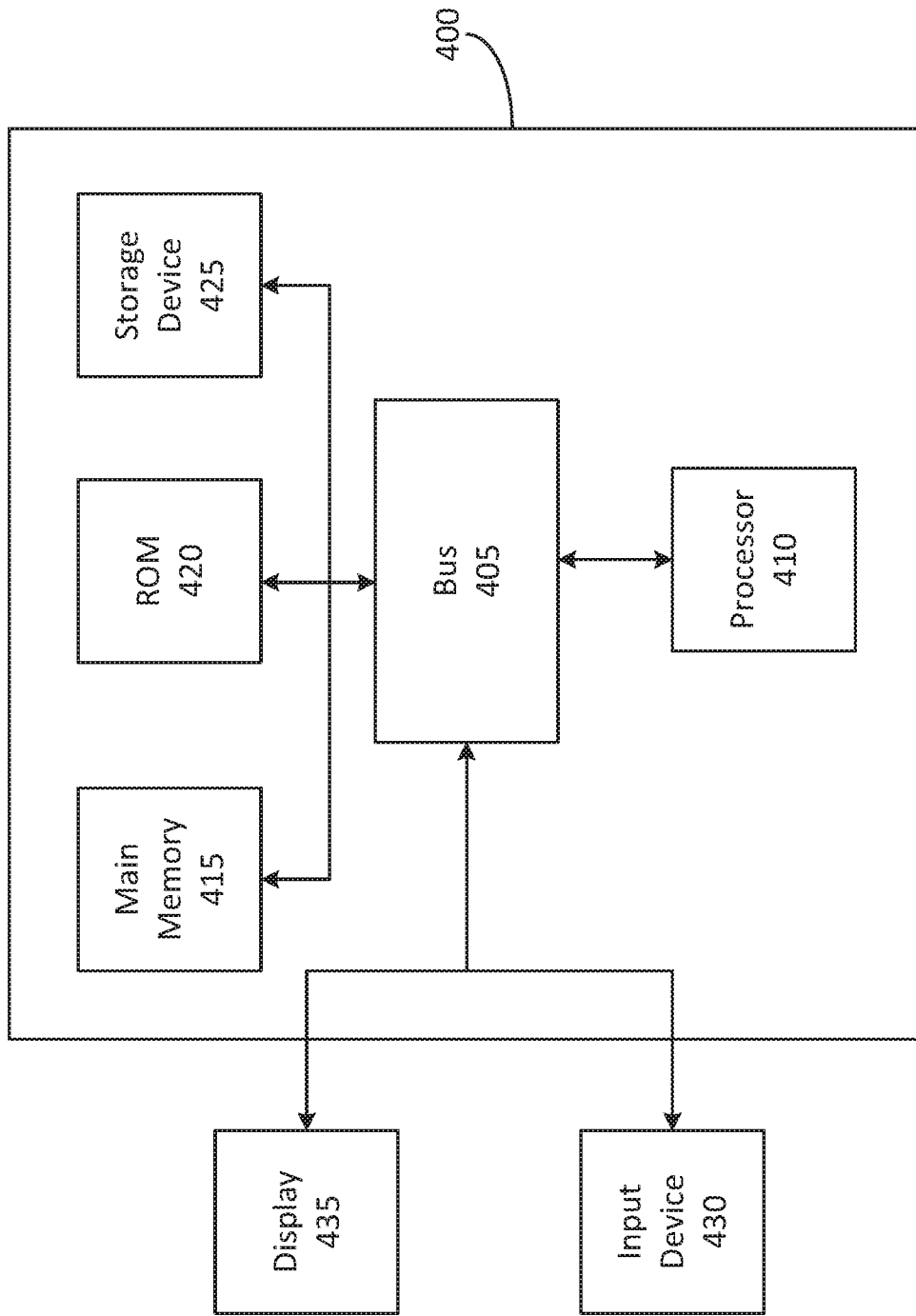
FIG. 4 is a block diagram illustrating a general architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system 400 can also be referred to as a computing device 400. The computer system 400 can include or be used to implement the system 100, or its components such as the data processing system 102. The data processing system 102 can include an intelligent personal assistant or voice-based digital assistant. The computer system 400 includes a bus 405 or other communication component for communicating information and a processor 410 or processing circuit coupled to the bus 405 for processing information. The computer system 400 can also include one or more processors 410 or processing circuits coupled to the bus for processing information. The computer system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computer system 400 can further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computer system 400 can be coupled via the bus 405 to a display 435, such as a liquid crystal display, or active matrix display, for displaying information to a user. An input device 430, such as a keyboard including alphanumeric and other keys, can be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 140 or other component of FIG. 1, for example.

The processes, systems and methods described herein can be implemented by the computer system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computer system 400 to perform the illustrative processes described herein. One or more processors in a multi-processing arrangement can also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or can make use of personal information, the users can be provided with an opportunity to control whether programs or features that can collect personal information (e.g., information about a user's social network, social actions or activities, a user's preferences, or a user's location), or to control whether or how to receive content from a content server or other data processing system that is more relevant to the user. In addition, certain data can be anonymized in one or more ways before it is stored or used, so that personally identifiable information is removed when generating parameters. For example, a user's identity can be anonymized so that no personally identifiable information can be determined for the user, or a user's geographic location can be generalized where location information is obtained (such as to a city, postal code, or state level), so that a particular location of a user cannot be determined. Thus, the user can have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices. e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A computer system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 140 or the application developer device 160 or the third-party device 162).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the MY component 106 or the direct action API 108, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method implemented by one or more processors, the method comprising:
   receiving a request to generate a voice-based software application, the request including a uniform resource locator (URL) associated with a service provided by the voice-based software application and an identifier corresponding to an entity of an application developer associated with the voice-based software application;
   selecting, based on the request and from a set of verification policies, a particular verification policy;
   identifying a plurality of hypertext transfer protocol (HTTP) links that include the URL as a target, each link including a respective character string;
   parsing the respective character string of each link of the plurality of links to determine a subset of the plurality of links having a respective character string that includes a reference to the identifier;
   determining a verification status of the request based on the particular verification policy and the subset of the plurality of links; and
   assigning a trigger keyword to the voice-based software application, responsive to determining that the verification status of the request indicates that the request is verified.

2. The method according to claim 1, wherein selecting the particular verification policy is further based on a type of the voice-based software application associated with the request.

3. The method according to claim 1, further comprising determining a risk level associated with the voice-based software application associated with the request,
   wherein selecting the particular verification policy is further based on the risk level of the voice-based software application associated with the request.

4. The method according to claim 1, wherein selecting the particular verification policy is further based on a popularity of the URL included in the request.

5. The method of claim 1, further comprising comparing the subset of the plurality of links to a particular threshold corresponding to the particular verification policy to determine a match level,
   wherein determining the verification status of the request is further based on the match level.

6. The method according to claim 1, further comprising:
   receiving, from a mobile computing device, an audio input corresponding to the trigger keyword; and
   causing the voice-based software application to execute on the mobile computing device, responsive to receiving the audio input corresponding to the trigger keyword.

7. A computer program product comprising one or more non-transitory computer-readable storage media having program instructions collectively stored on the one or more non-transitory computer-readable storage media, the program instructions executable to:
   receive a request to generate a voice-based software application, the request including a uniform resource locator (URL) associated with a service provided by the voice-based software application and an identifier corresponding to an entity of an application developer associated with the voice-based software application;
   select, based on the request and from a set of verification policies, a particular verification policy;
   identify a plurality of hypertext transfer protocol (HTTP) links that include the URL as a target, each link including a respective character string;
   parse the respective character string of each link of the plurality of links to determine a subset of the plurality of links having a respective character string that includes a reference to the identifier;
   determine a verification status of the request based on the particular verification policy and the subset of the plurality of links; and
   assign a trigger keyword to the voice-based software application, responsive to determining that the verification status of the request indicates that the request is verified.

8. The computer program product according to claim 7, wherein selecting the particular verification policy is further based on a type of the voice-based software application associated with the request.

9. The computer program product according to claim 7, wherein:
   the program instructions are further executable to determine a risk level associated with the voice-based software application associated with the request; and
   selecting the particular verification policy is further based on the risk level of the voice-based software application associated with the request.

10. The computer program product according to claim 7, wherein selecting the particular verification policy is further based on a popularity of the URL included in the request.

11. The computer program product according to claim 7, wherein:
the program instructions are further executable to compare the subset of the plurality of links to a particular threshold corresponding to the particular verification policy to determine a match level; and
determining the verification status of the request is further based on the match level.

12. The computer program product according to claim 7, wherein the program instructions are further executable to:
receive, from a mobile computing device, an audio input corresponding to the trigger keyword; and
cause the voice-based software application to execute on the mobile computing device, responsive to receiving the audio input corresponding to the trigger keyword.

13. A system comprising:
a processor, a computer-readable memory, one or more non-transitory computer-readable storage media, and program instructions collectively stored on the one or more non-transitory computer-readable storage media, the program instructions executable to:
receive a request to generate a voice-based software application, the request including a uniform resource locator (URL) associated with a service provided by the voice-based software application and an identifier corresponding to an entity of an application developer associated with the voice-based software application;
select, based on the request and from a set of verification policies, a particular verification policy;
identify a plurality of hypertext transfer protocol (HTTP) links that include the URL as a target, each link including a respective character string;
parse the respective character string of each link of the plurality of links to determine a subset of the plurality of links having a respective character string that includes a reference to the identifier;
determine a verification status of the request based on the particular verification policy and the subset of the plurality of links; and
assign a trigger keyword to the voice-based software application, responsive to determining that the verification status of the request indicates that the request is verified.

14. The system according to claim 13, wherein selecting the particular verification policy is further based on a type of the voice-based software application associated with the request.

15. The system according to claim 13, wherein:
the program instructions are further executable to determine a risk level associated with the voice-based software application associated with the request; and
selecting the particular verification policy is further based on the risk level of the voice-based software application associated with the request.

16. The system according to claim 13, wherein selecting the particular verification policy is further based on a popularity of the URL included in the request.

17. The system according to claim 13, wherein:
the program instructions are further executable to compare the subset of the plurality of links to a particular threshold corresponding to the particular verification policy to determine a match level; and
determining the verification status of the request is further based on the match level.

18. The system according to claim 13, wherein the program instructions are further executable to:
receive, from a mobile computing device, an audio input corresponding to the trigger keyword; and
cause the voice-based software application to execute on the mobile computing device, responsive to receiving the audio input corresponding to the trigger keyword.

\* \* \* \* \*